United States Patent
Otsuji et al.

(10) Patent No.: US 12,424,848 B2
(45) Date of Patent: Sep. 23, 2025

(54) POWER SYSTEM

(71) Applicants: TOHOKU UNIVERSITY, Sendai (JP); FURUKAWA ELECTRIC CO., LTD., Tokyo (JP)

(72) Inventors: Taiichi Otsuji, Miyagi (JP); Katsumi Iwatsuki, Miyagi (JP); Hirohito Yamada, Miyagi (JP); Masafumi Yashima, Miyagi (JP); Masakazu Matsui, Tokyo (JP); Hiroyuki Koshi, Tokyo (JP)

(73) Assignees: TOHOKU UNIVERSITY, Sendai (JP); FURUKAWA ELECTRIC CO., LTD., Tokyo (JP)

( * ) Notice: Subject to any disclaimer, the term of this patent is extended or adjusted under 35 U.S.C. 154(b) by 20 days.

(21) Appl. No.: 18/333,026

(22) Filed: Jun. 12, 2023

(65) Prior Publication Data
US 2023/0327436 A1    Oct. 12, 2023

Related U.S. Application Data

(63) Continuation of application No. PCT/JP2021/048044, filed on Dec. 23, 2021.

(30) Foreign Application Priority Data

Jan. 4, 2021    (JP) .................... 2021-000167

(51) Int. Cl.
*H02J 1/12* (2006.01)
*H02J 3/32* (2006.01)
*H02J 3/38* (2006.01)

(52) U.S. Cl.
CPC .............. *H02J 1/12* (2013.01); *H02J 3/32* (2013.01); *H02J 3/38* (2013.01)

(58) Field of Classification Search
CPC ...................................................... H02J 1/12
USPC ............................................................. 307/43
See application file for complete search history.

(56) References Cited

U.S. PATENT DOCUMENTS 3,823,358 A  *  7/1974  Rey .................... H02J 7/34
                                                    307/66
9,494,924 B2    11/2016  Matsuda et al.
2012/0228935 A1*  9/2012  Nakashima ........ H02J 3/381
                                                    307/24

(Continued)

FOREIGN PATENT DOCUMENTS

CN            110829433 A      2/2020
DE     10 2018 216 785 A1      4/2020
(Continued)

OTHER PUBLICATIONS

International Search Report issued Feb. 8, 2022 in PCT/JP2021/048044, filed on Dec. 23, 2021, 2 pages.

(Continued)

*Primary Examiner* — Joseph Chang
(74) *Attorney, Agent, or Firm* — Oblon, McClelland, Maier & Neustadt, L.L.P.

(57) ABSTRACT

A power system includes: a direct-current bus to which a power generation device and a plurality of power devices are connected; and a plurality of battery devices connected at predetermined intervals from one end of the direct-current bus to another end and configured to supply and receive power to and from the direct-current bus.

8 Claims, 10 Drawing Sheets

(56) References Cited

U.S. PATENT DOCUMENTS

2022/0094191 A1 3/2022 Suzuki et al.

FOREIGN PATENT DOCUMENTS

| | | |
|---|---|---|
| JP | 2012-228023 A | 11/2012 |
| JP | 2016-25711 A | 2/2016 |
| JP | 2019-146314 A | 8/2019 |
| WO | WO 2013/172088 A1 | 11/2013 |
| WO | WO 2020/161767 A1 | 8/2020 |

OTHER PUBLICATIONS

Extended European Search Report Issued Nov. 20, 2024 in European Application 21915213.9, 8 pages.

* cited by examiner

POWER SYSTEM

This application is a continuation of International Application No. PCT/JP2021/048044, filed on Dec. 23, 2021 which claims the benefit of priority of the prior Japanese Patent Application No. 2021-000167, filed on Jan. 4, 2021, the entire contents of which are incorporated herein by reference.

BACKGROUND

The present disclosure relates to a power system.

A smart city and a compact city realizing Society 5.0 in which a cyber space and a physical space of a CPS (Cyber Physical System) are highly fused are expected in realizing efficient and advanced functions and services that cities and areas have and enabling both solving of problems, such as decarbonization, that the society should intend and economic development made by reforming the industrial structure by, digital transformation, etc.

Against the background of an increase in investments (ESG investments) in consideration of three elements of environment, social and governance and adoption of "The 2030 Agenda for Sustainable Development" (Sustainable Development Goals (SDGs)) in United Nations Summit in September 2015, the number of members of RE 100 (Renewable Energy 100%) participable by companies declaring business operations using only renewable energies is increasing.

It is estimated that smart city markets around the world will reach 3,100 trillion yen in total in 20 years from 2010 to 2030 and, as for the core energy markets, a market scale of 720 trillion yen in smart grids, and 310 trillion yen in next-generation vehicles, such as EV (Electric Vehicle), and 380 trillion yen in renewable energies is expected. For this reason, smart city plans are promoted in many countries and regions and the plans have been already partly started.

International Publication Pamphlet No. WO 2013/172088 proposes a system in which distributed power source including solar power generation, wind power generation, battery, and power battery systems, social infrastructures including EVs and charging stations, a HEMS (Home Energy Management System) and a BEMS (Building Energy Management System), and a power plant are connected with one another with a communication grid and a power grid.

As for the power grid, there is one that supplies power with a direct-current bus and there is, as a disclosure that stabilizes the voltage of a direct-current bus that a direct-current power supply system includes, for example, the direct-current power supply system disclosed in Japanese Laid-open Patent Publication No. 2012-228023. In the direct-current power supply system, a solar power system and a battery unit are connected to the direct-current bus. The battery unit has a configuration in which two sets of batteries consisting of secondary batteries are connected in series. The two sets of batteries are connected in series between a positive busbar and a negative busbar of the direct current bus via a battery controller and a midpoint is grounded. Each of the batteries repeats charging and discharging and accordingly the line voltage between the positive busbar and the midpoint and the line voltage between the negative busbar and the midpoint are leveled.

SUMMARY

In a direct-current bus, a plurality of loads, such as a power generation system and electronic equipment, are connected along the direct current bus. For example, when an EV is connected and rapid charging requiring a high current (power) temporarily is performed, the voltage at the point lowers and temporary fluctuations occur in the voltage of the direct-current bus. When a sufficient time passes after the high-current (power) load is separated, a current flows via an electric resistance of the direct current bus and the fluctuations in the voltage are leveled; however, in the case where a power cable that is used for the direct current bus is thin and the electric resistance per unit length is large, with such passive leveling only, it takes a long time in some cases to cancel the fluctuations in the voltage.

In the direct-current power supply system according to Japanese Laid-open Patent Publication No. 2012-228023, while the voltage of the direct current bus is leveled by the battery unit, there is a risk that, when the battery unit is arranged in a concentrative manner in a position on the direct current bus, a difference in voltage from a position distant from the battery unit may occur.

There is a need for a technique for canceling the voltage difference in the direct-current bus in a shorter period.

According to one aspect of the present disclosure, there is provided a power system including: a direct-current bus to which a power generation device and a plurality of power devices are connected; and a plurality of battery devices connected at predetermined intervals from one end of the direct-current bus to another end and configured to supply and receive power to and from the direct-current bus.

DETAILED DESCRIPTION

Figure 1:
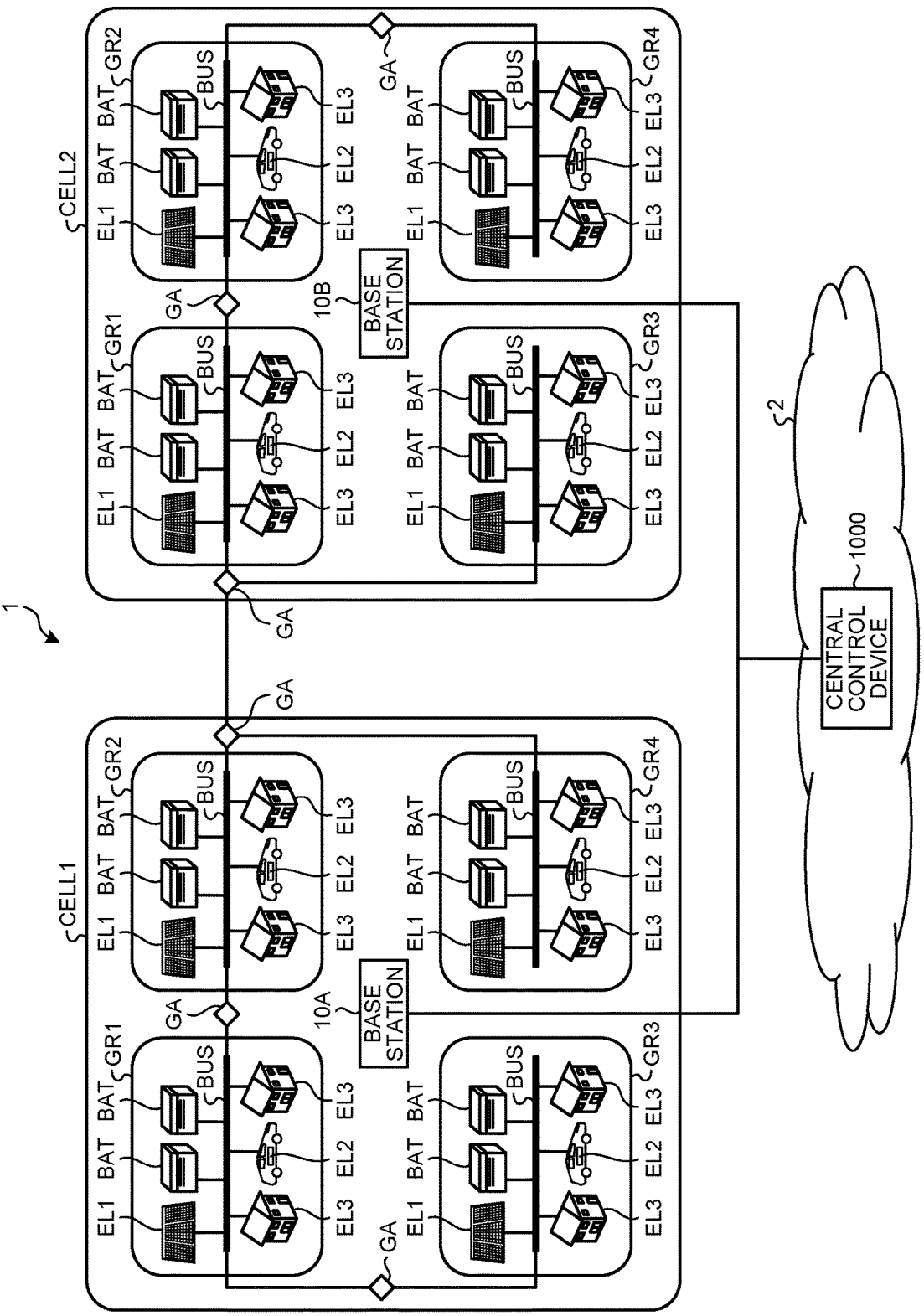
FIG. 1 is a diagram illustrating a configuration of a network system according to an embodiment.

Embodiments of the disclosure will be described in detail below according to the drawings. Note that the embodiments described below do not limit the present disclosure. In the illustration of the drawings, the same or corresponding components are denoted with the same reference numerals as appropriate.

First Embodiment

FIG. 1 is a diagram illustrating a configuration of a network system according to an embodiment. A network system 1 is a power-communication fused network in which a wireless communication network according to 5G (the 5th Generation Mobile Communication System) including a base station 10A, a base station 10B, and a plurality of antennae of which illustration in the drawings is omitted and a power network that is formed of a plurality of direct-current grids GR1 to GR4 that are power grids are fused.

The base station 10A and the base station 10B are radio base stations that form a 5G wireless communication network. Note that 5G has characteristics of "ultrafast", "ultralow delay", and "multiple concurrent connections". As for "ultralow delay", for example, about 1 millisecond or smaller is ensured as a communication delay time. Wireless communication standards are not limited to 5G and communication standards of a mobile communication system of a generation of 5G or after referred to as B (Beyond) 5G may be used. Communication standards ensuring a communication delay time are more preferable. The base station 10A forms a communication area CELL1 enabling communication with a wireless terminal device that performs 5G wireless communication using the antennae of which illustration in the drawings is omitted and the base station 10B forms a communication area CELL2 enabling communication with a wireless terminal device that performs 5G wireless communication using the antennae of which illustration in the drawings is omitted. The area of a communication area CELL1 is, for example, an area around the base station 10A with a radius of 1 km but is not limited to an area with a radius of 1 km. Note that FIG. 1 illustrates the two base stations 10A and 10B; however, the number of base stations contained in the network system 1 is not limited two and it may be three.

In the communication area CELL1 and the communication area CELL2, a plurality of predetermined buses BUS are set. The bus BUS that is a direct-current bus is a direct-current power line to which a plurality of electric devices including a power generation device and a battery device are connected. In the communication area CELL1 and the communication are CELL2, the direct-current grids GR1 to GR4 that are the direct-current power grids are formed using the buses BUS.

The direct-current girds are provided with power gates GA that perform power interchange between the direct-current grids GR1 to GR4. The power gates GA are provided also between the direct-current grid that is provided in the communication area CELL 1 and the direct-current grid that is provided in the communication area CELL 2, controls the amount and direction of power that is interchanged between the direct-current grids, and performs power interchange across the communication area CELL 1 and the communication area CELL 2. The power gates GA have a function of 5G wireless communication, function as radio terminal devices, and perform information communication with an MEC server 101 to be described below via the antennae of which illustration is omitted.

A cloud system 2 is a system that provides various types of services via a network, such as the Internet, and includes a central control device 1000. The central control device 1000 is connected to the base station 10A and the base station 10B. The central control device 1000 is a server device that has a function of controlling power interchange that is performed between the direct-current grids GR1 to GR4 contained in the communication area CELL1 and the direct-current grids GR1 to GR4 contained in the communication area CELL2.

Figure 2:
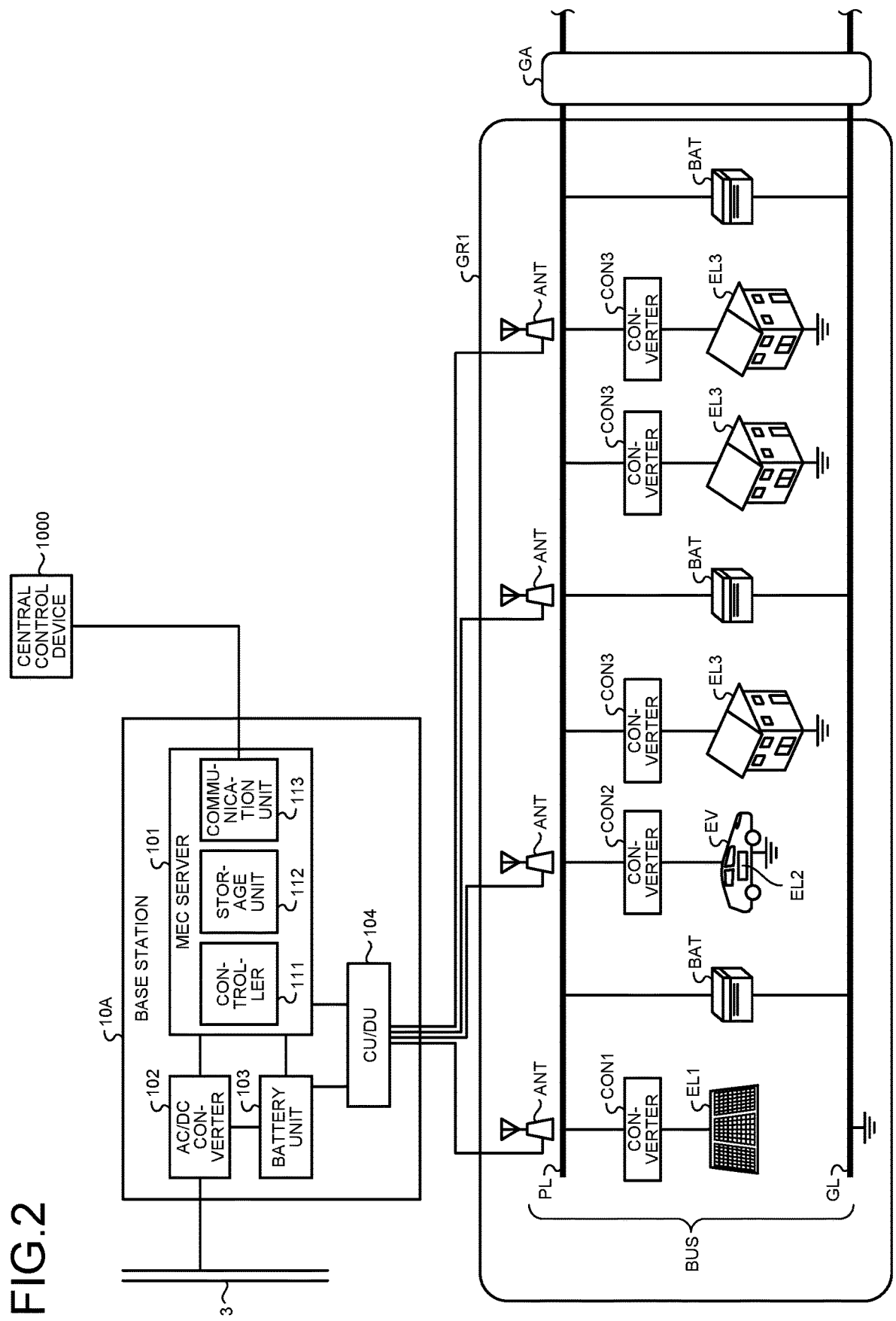
FIG. 2 is a diagram illustrating a configuration of a base station and a direct-current grid.

FIG. 2 is a diagram illustrating an example of a configuration of the base station 10A and the direct-current grid GR1. Note that the configuration of the base station 10B is the same as that of the base station 10A and thus the configuration of the base station 10A is illustrated representatively in FIG. 2 and illustration of the configuration of the base station 10B is omitted. In FIG. 2, in order to prevent the drawing from being complicated, the configuration of the direct-current grid GR1 is illustrated representatively among the direct-current grids GR1 to GR4 contained in the communication area CELL1 formed by the base station 10A.

In the communication area CELL 1, a plurality of antennae ANT are arranged. The antennae ANT are distributed antennae that form the 5G wireless communication network. The antenna ANT has a function of an RU (radio unit) in 5G wireless communication. Each of the antennae ANT connected to the base station 10A via an optical fiber cable forms a small cell enabling communication with a radio terminal device and a plurality of the small cells form the communication area CELL 1. The small cell formed by the antenna ANT is, for example, an area around the antenna ANT with a radius of 125 m. A plurality of antennae ANT are connected to the base station 10B, too, via optical fiber cables and each of the antennae ANT connected to the base station 10B forms a small cell enabling communication with a radio terminal device and a plurality of the small cells form the communication area CELL 2.

The base station 10A includes the MEC server 101, an AC/DC converter 102, a battery unit 103, and a CU/DU 104. The direct-current grid GR1 includes a bus BUS, converters CON1 to CON3, power elements EL1 to EL3, and a plurality of battery devices BAT. The direct-current grid GR1 is provided in, for example, a communication area formed by four antennae ANT. Note that the number of the antennae ANT forming the communication area containing the direct-current grid GR1 is not limited to four, and it may be three or smaller or five or more.

First of all, the configuration of the base station 10A will be described. The AC/DC converter 102 is connected to a commercial power system 3. The AC/DC converter 102 converts an alternating-current power into a direct-current power and supplies the direct-current power to the MEC server 101 and the battery unit 103.

The battery unit 103 consists of at least one battery. A power generation device, such as a renewable energy source, may be connected to the battery unit 103. The power stored in the battery unit 103 is suppled as drive power to the MEC server 101 and the CU/DU 104. The battery unit 103 may supply power to the antennae ANT via metal cables.

The CU/DU 104 has a function of a CU (Central Unit) and a function of a DU (Distributed Unit) in 5G communication. The CU/DU 104 is connected to the antennae ANT forming the communication area via optical fiber cables. The CU/DU 104 is connected to the MEC server 101.

The MEC server 101 that is an example of a control device is a MEC (Mobile Edge Computing) server device that is set in a position close to the wireless terminal device. The MEC server 101 includes a controller 111, a storage unit 112, and a communication unit 113.

The controller 111 performs various types of arithmetic operations for implementing functions of the MEC server 101 and, for example, is configured by including processors, such as a CPU (Central Processing Unit), an ASIC (Application Specific Integrated Circuit), a FPGA (Filed-Programmable Gate Array), a DSP (Digital Signal Processor), and a GPU (Graphics Processing Unit). The function of the controller 111 is implemented by the controller 111 by reading various programs from the storage unit 112.

For example, the controller 111 reads the various programs from the storage unit 112 and executes the programs, thereby implementing a function of performing information communication with the battery devices BAT, the converters CON1 to CON3, and the power elements EL1 to EL3 and integrally managing the states of the direct-current grids GR1 to GR4 that are set in the communication area CELL 1, a function of performing centralized control on the converters CON1 to CON3, a function of controlling power interchange that is performed between the direct-current grids GR1 to GR4, and a function of controlling power interchange that is performed between the direct-current grid that is set in an adjacent communication area according to an instruction from the central control device 1000.

The storage unit 112 includes, for example, a ROM (Read Only Memory) in which the various programs and data used by the controller 111 to perform the arithmetic operations, etc., are stored. The storage unit 112 includes, for example, a RAM (Random Access Memory) that is used as a working space for the controller 111 to perform arithmetic operations and is used for storing the result of arithmetic operations by the controller 111. The storage unit 112 may include an auxiliary storage device, such as a hard disk drive (HDD) or a SSD (Solid State Drive).

The communication unit 113 is configured by including a communication module that performs wired or wireless information communication. The communication unit 113 is connected to the central control device 1000. The communication unit 113 performs information communication with the central control device 1000 via the Internet.

A configuration of the direct-current grid GR1 that is an example of a power system will be described next. The bus BUS consists of a ground line that is an example of a reference line and a power line PL that is an example of a first power line and has a length of, for example, 1 km and the voltage of the power line PL has a potential difference with respect to the ground line GL is, for example, +400 V. The ground line GL that is an example of the reference line may be grounded.

The battery device BAT is, for example, a stationary battery device capable of supplying power and being charged and is connected to the bus BUS. The stationary battery device is an example of a battery device in a facility that is installed permanently and is, for example, a lithium-ion battery or an electric double layer capacitor. The battery devices BAT are distributed at predetermined intervals and are directly connected to the bus BUS not via DC/DC converters. The intervals between the battery devices BAT are, for example, 100 to 200 m. In FIG. 2, in order to prevent the drawing from being complicated, three battery device BAT are illustrated; however, four or more battery devices BAT are connected to the bus BUS in some cases. Even when the number of the battery device BAT is one and a plurality of battery devices BAT are set in one site, the voltage of the bus BUS lowers as it separates from the battery devices BAT and connecting, even with a small capacity, as many battery devices BAT as possible to the bus BUS at the predetermined intervals not via DC/DC converters applies large electrical inertia to the bus BUS and makes it possible to inhibit occurrence of a voltage difference in the bus BUS.

Figure 3A:
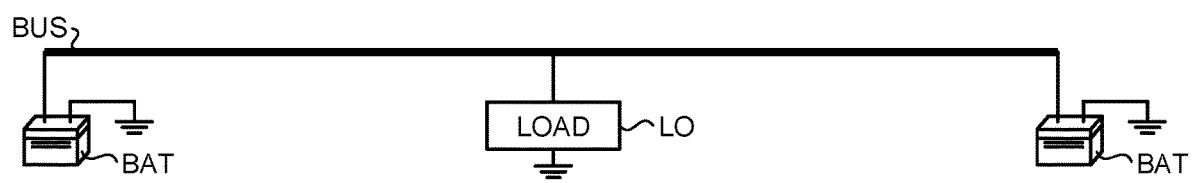
FIG. 3A is a diagram illustrating an example of connection of battery devices and a load to a bus.
Figure 3B:
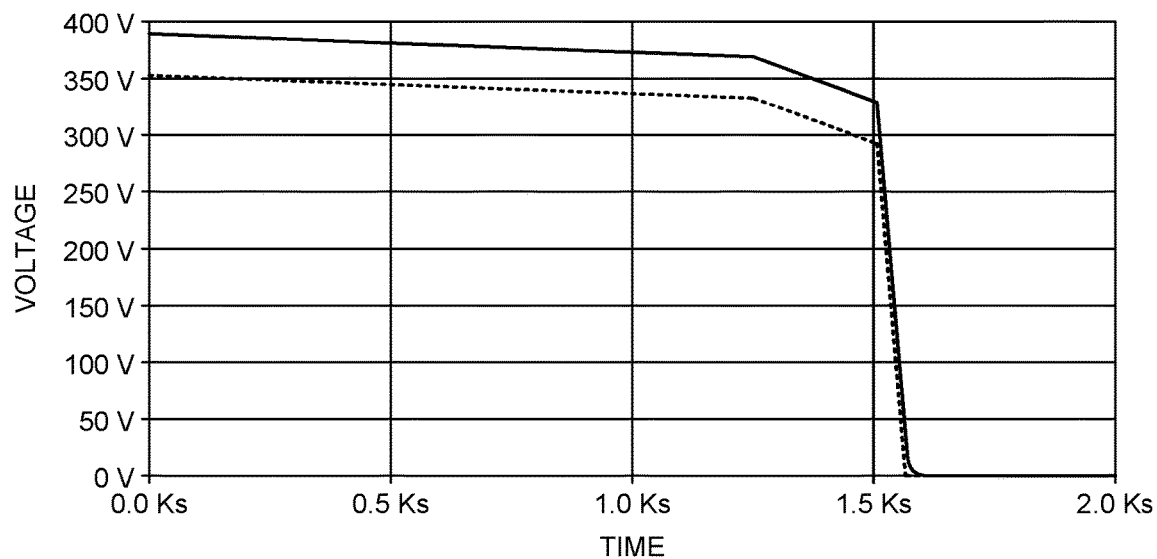
FIG. 3B is a diagram illustrating a result of simulation.

FIG. 3B is a graph representing the result of a simulation of changes in the voltage at a center part of the bus BUS in the case where the battery devices BAT are connected to both ends of the bus BUS and a load LO is connected to the center as illustrated in FIG. 3A. In the simulation, the length of the bus BUS is 1 km and a current of 100 A flows into the load LO. The internal resistance of the battery device BAT is 0.2Ω, the capacity is 25 Ah, and the SOC at the time when power supply to the load is started is 80%. The solid line presented in FIG. 3B represents the voltage in the position in which the battery device BAT is connected and the dashed line presented in FIG. 3B represents the voltage in the position in which the load LO is connected.

Figure 4A:
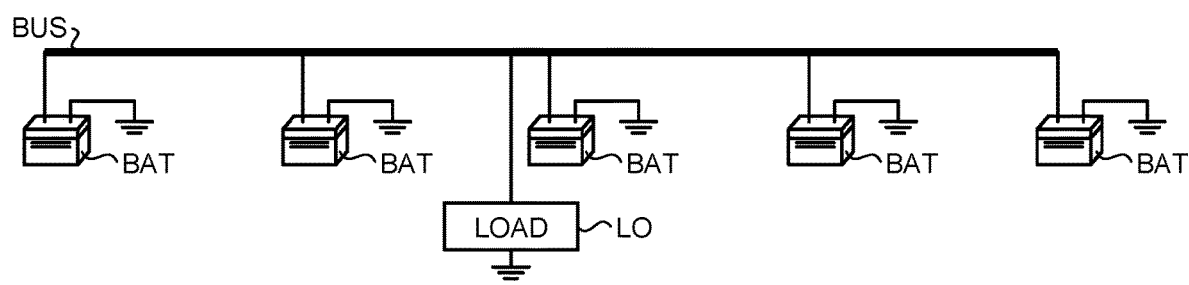
FIG. 4A is a diagram illustrating an example of connection of battery devices and a load to a bus.
Figure 4B:
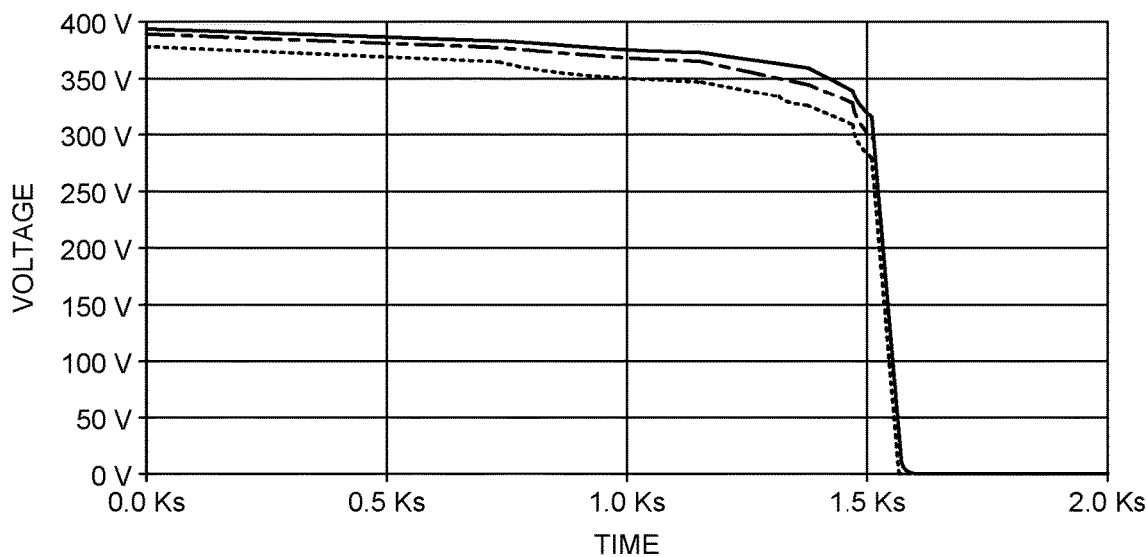
FIG. 4B is a diagram illustrating a result of simulation.

FIG. FIG. 4B is a graph representing the result of a simulation of changes in the voltage at the center part of the bus BUS in the case where five battery devices BAT are arranged in a distributed manner with respect to the bus BUS and the load LO is connected to the center as illustrated in FIG. 4A. In the simulation, the length of the bus BUS is 1 km and a current of 100 A flows into the load LO. The interval between the battery devices BAT is 250 m, the internal resistance of the battery device BAT is 0.5Ω, the capacity is 10 Ah, and the SOC at the time when power supply to the load is started is 80%. The solid line presented in FIG. 4B represents the voltage in the position in which the battery device BAT at the left end is connected and the dashed line presented in FIG. 4B represents the voltage in the position in which the load LO is connected.

When FIG. 3B and FIG. 4B are compared with respect to the voltage in the position in which the load LO is connected, it is represented that the voltage drop is smaller and the electric inertia is higher in the case where five battery devices BAT are arranged in a distributed manner at the time when the same time elapses.

Note that it is preferable to adjust the number of cells of the battery devices BAT to match a reference voltage that is set in the bus BUS. A direct-current breaker that interrupts the current between the bus BUS and the battery device BAT may be provided between the bus BUS and the battery device BAT.

The power element EL1 is, for example, a solar power generation device capable of generating and supplying power and is connected to the converter CON1. The solar power generation device is an example of a power generation device that generates power using renewable energy. The converter CON1 has a function of converting the voltage of direct-current power that is supplied by the power element EL1 and outputting the converted voltage to the bus BUS. The power element EL1 is not limited to a solar power generation device, and the power element EL1 may be a renewable energy source, such as a wind power generation device or a geothermal power generation device. When the power generation element EL1 is an element that does not control the amount of power generation in terms of efficiency like a solar power generation device, the converter CON1 may execute control according to a MPPT (Maximum Power Point Tracking) method of, when power corresponding to the amount of power generation is input from the power element EL1, causing an operation such that the output power to the bus BUS is maximized at the amount of power generation.

The power element EL2 is, for example, an on-board battery device capable of supplying and consuming power and being charged and is connected to the converter OCN2.

The on-board battery device is mounted on an electric vehicle EV and is an example of a non-stationary battery device. The converter CON2 has a function of converting the voltage of direct-current power that is supplied by the power element EL2 and outputting the converted voltage to the bus BUS and converting the voltage of direct-current power that is supplied from the bus BUS and outputting the converted voltage to the power element EL2 to charge the power element EL2. The converter CON2 is provided in, for example, a charging station or a house charging facility, and the converter CON2 may be mounted on the electric vehicle EV.

The power element EL3 is, for example, a ZEH (Bet Zero Energy House) capable of supplying and consuming power and being charged and is connected to the converter CON3. The ZEH includes, for example, a solar power generation device and a battery and electric appliances, such as an air conditioner and a refrigerator that are power loads. The converter CON3 has a function of converting the voltage of direct-current power that is supplied by the power element EL3 and outputting the converted voltage to the bus BUS and converting the voltage of direct-current power that is supplied from the bus BUS and outputting the converted voltage to the power element EL3 to charge the battery that the power element EL3 includes.

In the bus BUS, the diameter of a part of the bus BUS to which a heavy load is connected and into which a high-current flows as in the case of rapid charging of the power element EL2 may be increased to increase the capacity and a part of the bus BUS to which no heavy load, such as the power element EL3, is connected may be reduced to reduce the capacity.

The converters CON1 to CON3 have a sensor that measures electric characteristic values of power of the bus BUS and measures, for example, a current value, a voltage value, a power value, etc., of the bus BUS as the electric characteristic values. The battery device BAT, the converters CON1 to CON3, and the power elements EL1 to EL3 function also as radio terminal devices including a function of 5G wireless communication and perform information communication with the MEC server 101 via the antennae ANT. For example, the battery device BAT transmits information on power storage performance and a power storage state to the MEC server 101. The power elements EL1 to EL3 transmit information, such as power generation performance, a power generation state, the power storage performance, the power storage state, and the power load, to the MEC server 101 and the converters CON1 to CON3 transmit the measured electric characteristic values to the MEC server 101.

The converters CON1 to CON3 previously store control information that sets rules for autonomous control and determine their own operations according to the rules. For example, the rules that are represented by the control information that each of the converters CON1 to CON3 stores are set such that the power in the bus BUS is smoothed according to the state of power receiving and supplying from and to the power elements EL1 to EL3 and, in each of the direct-current grids GR1 to GR4, the converters CON1 to CON3 performs autonomous distributed control according to the rules. In the direct-current grids GR1 to GR4, the power generation performance, the power generation state, the power storage performance, the power storage state, the power load, and electric characteristic values of the bus BUS vary moment by moment and autonomous distributed control is performed by each of the direct-current grids GR1 to GR4 and accordingly cancellation of the variations is enabled and power smoothing of the bus BUS is realized and electric power supply and demand is stabilized in the direct-current grids GR1 to GR4. Note that, for example, as for a control method in the direct-current grids GR1 to GR4, various control methods, such as feedback control, are usable.

The rules that the converters CON1 to CON3 store are updatable by the MEC server 101. The MEC server 101 acquires the information, such as the power generation performance, the power generation state, the power storage performance, the power storage state, and the power load, that is transmitted from the battery devices BAT and the power elements EL1 to EL3 and information on the electric characteristic values, such as the current value, the voltage value, and the power value of the bus BUS, that is transmitted from the converters CON1 to CON3, generates rules suitable for power smoothing on the bus BUS based on the acquired information, and updates the rules that the converters CON1 to CON3 stores with the generated rules.

In the present embodiment, when a power shortage occurs in a direct-current grid that is set in the communication area CELL1, when there is a leeway in the power of a direct-current grid that is set in the same communication area CELL1, the MEC server 101 controls the power gate GA, so that power is provided from the direct-current grid for the direct-current grid with the power shortage. In the present embodiment, the MEC server 101, for example, specifies a direct-current grid in which power is in shortage based on the acquired electric characteristic values of the bus BUS from each of the direct-current grids GR1 to GR4 and controls the power gate GA such that power is provided for the specified direct-current grid.

For example, when power interchange is performed between the direct-current grid GR1 and the direct-current grid GR2, the MEC server 101 communicates with the power gate GA between the direct-current grid GR1 and the direct-current grid GR2 and controls the power gate GA, thereby supplying power from the direct current grid GR1 for the direct-current grid GR2 or supplying power from the direct current grid GR2 for the direct-current grid GR1.

For example, when power interchange is performed between the direct-current grid GR3 and the direct-current grid GR2 via the direct-current grid GR1, the MEC server 101 communicates with the power gate GA between the direct-current grid GR1 and the direct-current grid GR2 and the power gate GA between the direct-current grid GR1 and the direct-current grid GR3 and controls the power gates GA, thereby supplying power from the direct current grid GR2 for the direct-current grid GR3 or supplying power from the direct current grid GR3 for the direct-current grid GR2.

Note that, for example, when a failure occurs in the antenna ANT due to a disaster, it is not possible to acquire information via the antenna ANT from the battery devices BAT, the power elements EL1 to EL3, and the converters CON1 to CON3. In this case, for example, dispatching a mobile base station in a form of a vehicle promptly enables the battery devices BAT, the power elements EL1 to EL3, and the converters CON1 to CON3 to be restored to the wireless communication network and enables the MEC server 101 to acquire information from the battery devices BAT, the power elements EL1 to EL3, and the converters CON1 to CON3 and perform power interchange between the direct-current grids.

Smoothing control on the electric power demand and supply in the direct-current grids GR1 to GR4 that are set in the communication areas CELL1 and CELL2 sometimes does not function effectively when the balance of the electric power demand and supply exceeds a predetermined limit. For example, even when the MEC server 101 and the individual converters CON1 to CON3 in the direct-current grids GR1 to GR4 operate to smooth the electric power demand and supply, in the case where the amount of power generation, the amount of power consumption, and the amount of power load variation that are adjustable in the current grids GR1 to GR4 are exceeded, power interchange in a range that may be provided by the direct-current grids GR1 to GR4 or over is necessary.

In such a case, in the network system 1, the central control device 1000 controls provision of power from one of the communication area CELL1 and the communication area CELL2 to the other. Specifically, in the case where a power shortage occurs in a direct-current grid that is set in the communication area CELL1 or the communication area CELL2, when there is a leeway in the power of a direct-current grid that is set in one of the communication areas, the central control device 1000 controls the MEC server 101 of the base station 10A and the MEC server 101 of the base station 10B, so that power is provided from the direct-current grid for the direct-current grid with the power shortage.

For example, the central control device 1000 acquires the information, such as the power generation performance, the power generation state, the power storage performance, the power storage state, and the power load, that is acquired by the MEC server 101 from the battery devices BAT and the power elements EL1 to EL3 and the information on the electric characteristic values of the bus BUS that is acquired from the converters CON1 to CON3. The central control device 1000 specifies a direct-current grid in which power is in shortage based on the acquired information and instructs the MEC server 101 of the base station 10A and the MEC server 101 of the base station 10B to provide power to the specified direct-current grid. According to the instruction from the central control device 1000, the MEC server 101 of the base station 10A and the MEC server 101 of the base station 10B control the power gate GA on the path from the bus BUS of the direct-current grid that supplies power to the bus BUS of the direct-current grid that receives power. Accordingly, it is possible to realize smoothing on electric power supply and demand.

According to the present embodiment described above, connecting the battery devices BAT to the bus BUS in a distributed manner at the predetermined intervals not via DC/DC converters makes it possible to apply large electrical inertia to the bus BUS and makes it possible to cancel the voltage difference in a short time. According to the present embodiment, because arranging the battery devices BAT in a distributed manner applies large electrical inertia to the bus BUS, it is possible to increase the diameter of the bus BUS in the part into which a high-current flows and reduce the diameter of the bus BUS in the part into which no high-current flows and, compared to the case where the capacity and the diameter are uniform over the bus BUS, it is possible to allow diversity in the configuration of the bus BUS.

In the case where one battery device BAT is connected to the bus BUS, when a failure occurs in the battery device BAT, the battery device BAT may not supply power and, in the case where a plurality of battery devices BAT are arranged in a distributed manner, the battery device BAT in which no failure occurs is able to continue power supply. In the case where a plurality of battery devices BAT are arranged in a distributed manner, a battery device BAT other than a battery device on which maintenance or live-line working is performed is able to supply power to the bus BUS and therefore, compared to the case where one battery device BAT is connected to the bus BUS, maintenance or live-line working are easy. When the battery devices BAT are arranged in a distributed manner, direct-grid networking is easy.

According to the present embodiment, even when a failure occurs in the antennae ANT covering the area of the direct-current grids GR1 to GR4 due to a disaster, for example, promptly setting a mobile base station that complements the wireless communication network makes it possible to restore the power elements EL1 to EL3 and the converters CON1 to CON3 and the battery devices BAT contained in the direct-current grids GR1 to GR4 and, compared to the power network system disclosed in International Publication Pamphlet No. WO 2013/172088, resilience is reinforced. According to the present embodiment, each of the direct-current grids GR1 to GR4 performs autonomous distributed control even when a disaster occurs, it is possible to cause the direct-current grids GR1 to GR4 to operate. According to the present embodiment, even when a failure occurs, because the base stations 10A and 10B and the direct-current grids GR1 to GR4 operate using the battery or a power generation facility, it is possible to perform power interchange in a communication area and resilience is reinforced.

Second Embodiment

A second embodiment will be described next. The second embodiment is different from the first embodiment in a configuration of a direct-current grid and is the same as the first embodiment in other configurations. Thus, in the following description, the same configurations as those of the second embodiment as those of the first embodiment are denoted with the same reference numbers and description thereof is omitted and different aspects from those of the first embodiment will be described.

Figure 5:
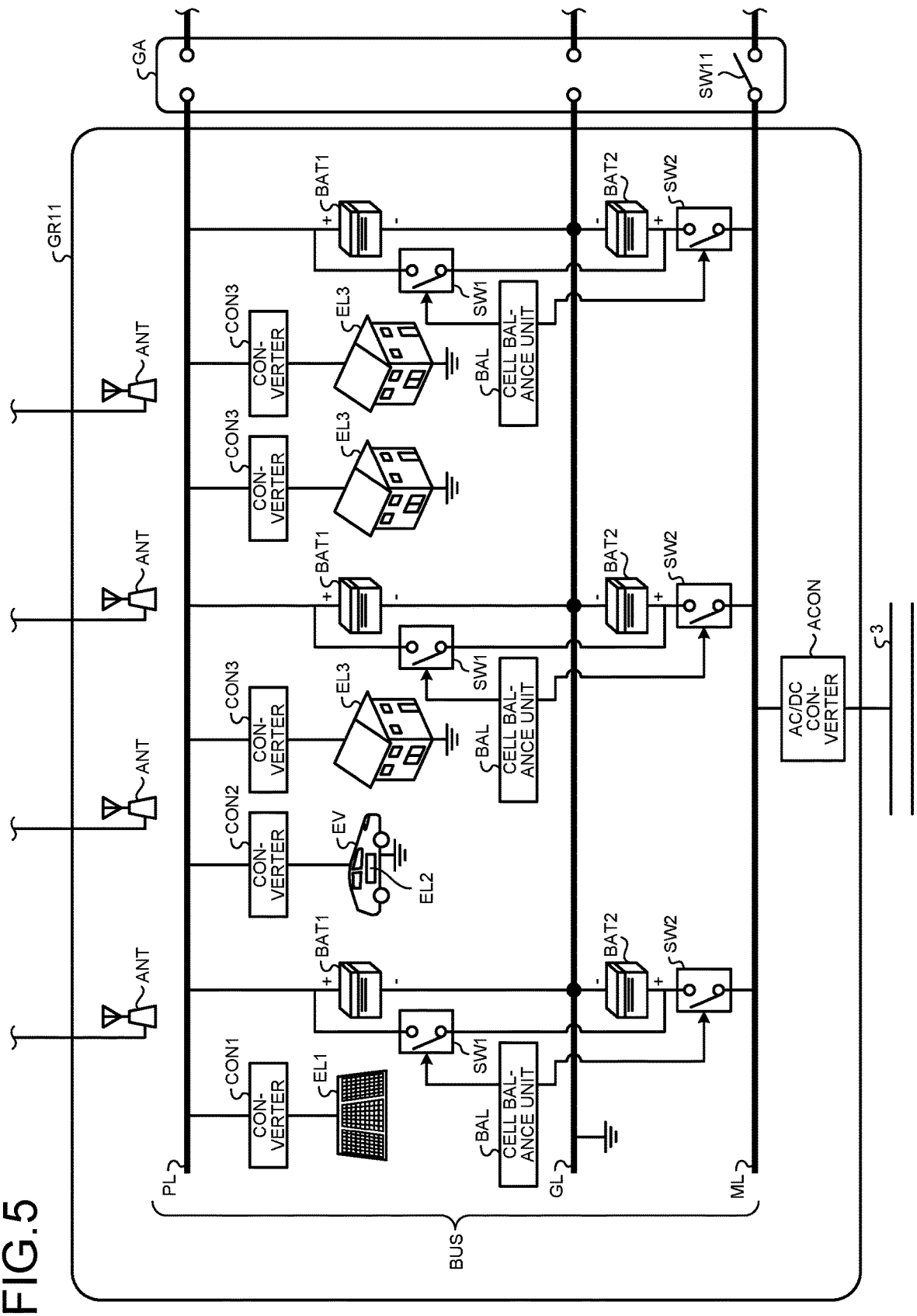
FIG. 5 is a diagram illustrating a configuration of a direct-current grid.

FIG. 5 is a diagram illustrating a configuration of a direct-current grid GR11 according to a second embodiment. The direct-current grid GR11 includes a plurality of first battery devices BAT1, a plurality of second battery devices BAT2, a plurality of first switches SW1, a plurality of second switches S2, and a plurality of cell balance units BAL. The cell balance unit BAL is an example of a balance controller.

In the second embodiment, a bus BUS consists of three lines and includes a first power line PL that is an example of a first power line, a second power line ML that is an example of a second power line, and a ground line GL that is an example of a reference line. The first power line PL has a potential difference of +400 V with respect to the ground line GL and the second power line ML has a potential difference of +400 V with respect to the ground line GL, too. The ground line GL that is an example of the reference line may be grounded. The second power line ML is connected to the power system 3 via an AC/DC converter ACON. The converters CON1 to CON3 are connected to the first power line PL.

A plurality of first battery devices BAT1 that are an example of a first battery and a plurality of second battery devices BAT2 that are an example of a second battery are stationary battery devices that are capable of supplying power and that are chargeable like the battery devices BAT. The first battery devices BAT1 and the second battery devices BAT2 are arranged with respect to a bus BUS in a distributed manner at predetermined intervals like the battery devices BAT of the first embodiment. The negative poles (second poles) of the first battery devices BAT1 and the second battery devices BAT2 are connected to the ground line GL.

Positive poles (first poles) of the first battery devices BAT1 are connected to the first power line PL and the first switches SW1. The first switch SW1 is also connected to, in addition to the first battery device BAT1, a positive pole (first pole) of the second battery device BAT2 and disconnects and connects the positive pole of the first battery device BAT1 and the positive pole of the second battery device BAT2.

The positive pole of the second battery device BAT2 is also connected to the second switch SW2 in addition to the first switch SW1. The second switch SW2 is also connected to the second power line ML in addition to the second battery device BAT2 and disconnects and connects the second power line ML and the positive pole of the second battery device BAT2.

The cell balance unit BAL is connected to the first switch SW1 and the second switch SW2 and has a function of equalizing the SOC (state of charge) of the first battery device BAT1 and the second battery device BAT2 to inhibit variations in the SOC between the first battery device BAT1 and the second battery device BAT2 in a pair.

Figure 6A:
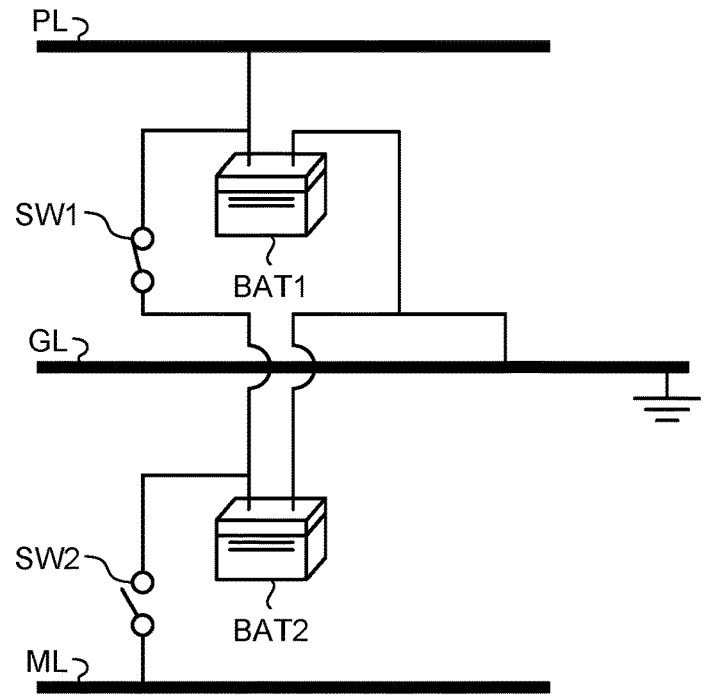
FIG. 6A is a diagram illustrating a method of controlling a first switch and a second switch.
Figure 6B:
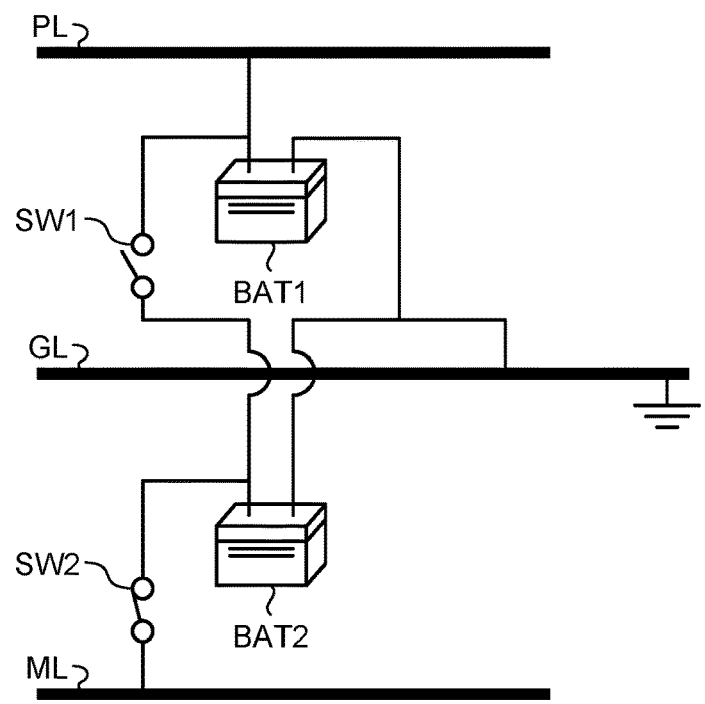
FIG. 6B is a diagram illustrating the method of controlling a first switch and a second switch.

FIG. 6A and FIG. 6B are diagrams illustrating a method of controlling the first switch SW1 and the second switch SW2. When power is supplied to the first power line PL1 from the first battery device BAT1 and the second battery device BAT2, the cell balance unit BAL turns the first switch SW1 on and turns the second switch SW2 off as illustrated in FIG. 6A. Controlling the first switch SW1 and the second switch SW2 as described above makes it possible to supply more power than in the first embodiment in a time zone with much power consumption, such as the daytime, using the first battery device BAT1 and the second battery device BAT2.

In a time zone with less power consumption, such as the night time, power is supplied from the first battery device BAT1 to the first power line PL. In this case, the cell balance unit BAL turns the first switch SW1 off and turns the second switch SW2 on as illustrated in FIG. 6B (step 11). Accordingly, the first battery devices BAT1 supplies power to the first power line PL. Performing step 11 equalizes the SOC of the second battery devices BAT2 via the second power line ML. Note that a potential difference may be caused in the second power line ML by providing a DC/DC converter between the second battery device BAT2 and the second power line ML, thereby actively realizing equalization of the SOC in a short time.

When the SOC of the second battery devices BAT2 is smaller than a predetermined value after the SOC of the second battery devices BAT2 is equalized, the second battery devices BAT2 may be charged such that the SOC is equal to the predetermined value or larger in the second battery devices BAT2 by supplying power from the power system 3 to the second battery devices BAT2 via the AC/DC converters ACON. After the SOC of the second battery devices BAT2 is equalized, the cell balance unit BAL turns the first switches SW1 on and turns the second switches SW2 off, thereby equalizing the SOC between the first battery device BAT1 and the second battery device BAT2 (step 12). Performing step 12 equalizes the SOC between the first battery devices BAT1 and the second battery device BAT2. When the SOC is not equal between the first battery devices BAT1 and the second battery device BAT2, the cell balance unit BAL repeats the operations at step 11 and step 12, thereby equalizing the SOC between the first battery device BAT1 and the second battery device BAT2. According to the configuration, because the SOC of the first battery device BAT1 is controlled by the second battery device BAT2 and the cell balance unit BAL, it is possible to control the SOC without disturbing the voltage of the first power line PL compared to the configuration of controlling the SOC by charging from the first power line PL.

In the second embodiment, when power interchange is performed between direct-current grids, the first switches SW1 are turned off, the second switches SW2 are turned on, and the switch SW11 that the power gate GA includes is turned on (step 21). Accordingly, the second battery devices BAT2 is equalized in the SOC with respect to the second battery devices BAT2 that are connected to an adjacent direct-current grid via the second power line ML. After the SOC is equalized in the second battery devices BAT2, the cell balance unit BAL turns on the first switches SW1 on and turns the second switches SW2 off, thereby equalizing the SOC between the first battery devices BAT1 and the second battery devices BAT2 (step 22). Performing step 21 and step 22 as described above equalizes the SOC. When the SOC is not equal between the first battery devices BAT1 and the second battery devices BAT2, the cell balance unit BAL repeats the operations at step S21 and step S22, thereby equalizing the SOC of the first battery devices BAT1 and the second battery devices BAT2. Accordingly, it is possible to perform power interchange of the second battery devices BAT2 between the adjacent direct-current grids.

A configuration in which voltage sensors are set at predetermined intervals on the first power line PL and the MEC server 101 acquires the result of measurement by the voltage sensors and senses a voltage drop in the first power line PL may be employed. In this case, in the case where a high current is necessary as in the case of rapid charging of the power element EL2 when the first switches SW1 are off in the time zone of the night time, a voltage drop near the converter CON2 may be sensed using the results of measurement by the voltage sensors and the voltage of the first power line PL may be inhibited from lowering by turning on the switch SW1 near the converter CON2. When such control is performed, by arranging a DC/DC converter between the positive pole of the first battery device BAT1 and the positive pole of the second battery device BAT2 and thus increasing the voltage of the second battery device BAT2, it is possible to equalize the voltage of the first power line PL in a short time. In such a case, turning the second switch SW2 on makes it possible to obtain power also from the power system 3 and equalize the voltage of the first power line PL in a short time.

A configuration in which, when the first battery device BAT1 and the second battery device BAT2 are connected in parallel, each of the positive poles of the first battery device BAT1 and the second battery device BAT2 are connected to the ground line GL may be employed. In this case, the negative pole of the first battery device BAT1 is connected to the first power line PL and the first switch SW1. The first switch SW1 is connected to the negative pole of the second battery device BAT2 in addition to the first battery device BAT1 and disconnects and connects the negative pole of the first battery device BAT1 and the negative pole of the second battery device BAT2. The negative pole of the second battery device BAT2 is connected to the second switch SW2 in addition to the first switch SW1. The second switch SW2 is connected also to the second power line ML in addition to the second battery device BAT2 and disconnects and connects the second power line ML and the negative pole of the second battery device BAT2. In the configuration, the negative pole serves as the first pole and the positive pole serves as the second pole.

Figure 7A:
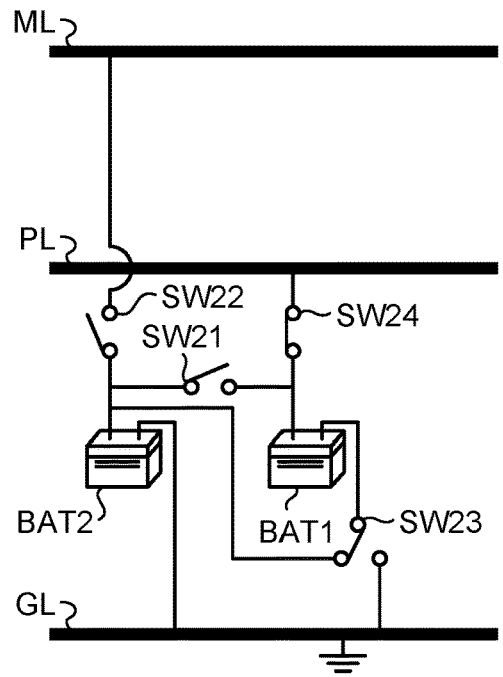
FIG. 7A is a diagram illustrating a method of controlling switches in a modification.
Figure 7B:
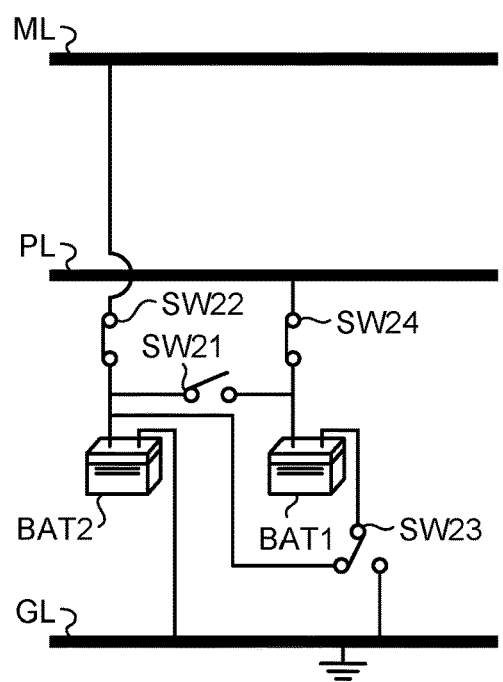
FIG. 7B is a diagram illustrating the method of controlling the switches in the modification.
Figure 7C:
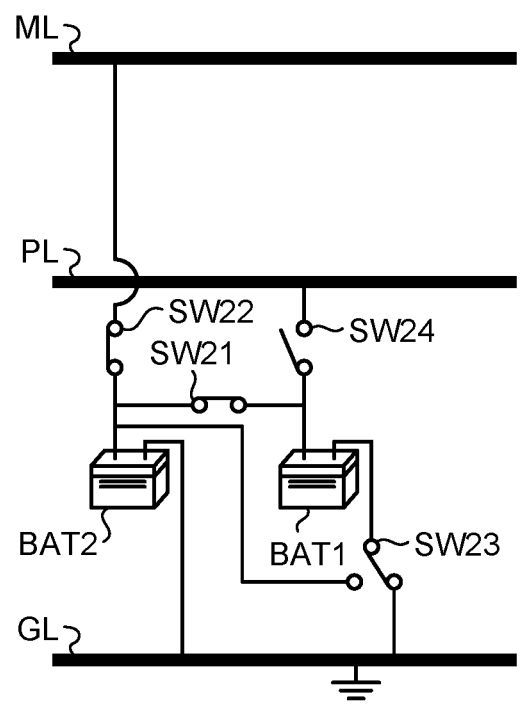
FIG. 7C is a diagram illustrating the method of controlling the switches in the modification.

In the second embodiment, the voltage of the first power line PL with respect to the ground line GL may be +800 V and the voltage of the second power line ML with respect to the ground line GL may be +400 V. FIG. 7A, FIG. 7B, and FIG. 7C are diagrams illustrating a configuration of connection of the first battery device BAT1, the second battery device BAT2, and the switches of that case. Note that, in FIG. 7A, FIG. 7B, and FIG. 7C, illustration of the cell balance unit BAL is omitted in order to prevent the drawings from being complicated.

A switch SW21 (first switch) is connected to the cell balance unit BAL, the positive pole (first pole) of the first battery device BAT1, and the positive pole (first pole) of the second battery device BAT2. A switch SW22 (second switch) is connected to the cell balance unit BAL, the second power line ML, and the positive pole of the second battery device BAT2. A switch SW23 (third switch) is connected to the cell balance unit BAL, a negative pole (second pole) of the first battery device BAT1, the positive pole of the second battery device BAT2, and the ground line GL. A switch SW24 (fourth switch) is connected a cell balance unit BAL, the first power line PL, and the positive pole of the first battery device BAT1. A negative pole (second pole) of the second battery device BAT2 is connected to the ground line GL. The cell balance unit BAL is an example of a balance controller.

To supply power from the first battery device BAT1 and the second battery device BAT2 to the first power line PL, as illustrated in FIG. 7A, the cell balance unit BAL turns the switch SW21 off, turns the switch SW22 off, and turns the switch SW24 on, and connects the negative pole of the first battery device BAT1 to the positive pole of the second battery device BAT2 using the switch SW23. Accordingly, the first battery device BAT1 and the second battery device BAT2 are connected in series between the first power line PL and the ground line GL.

To equalize the SOC of the first battery device BAT1 and the second battery device BAT2, first of all, as illustrated in FIG. 7B, the cell balance unit BAL turns the switch SW21 off, turns the switch SW22 on, turns the switch SW24 on, and connects the negative pole of the first battery device BAT1 to the positive pole of the second battery device BAT2 using the switch SW23 (step 21). Next, as illustrated in FIG. 7C, the cell balance unit BAL turns the switch SW21 on, turns the switch SW22 on, turns the switch SW24 off, and connects the negative pole of the first battery device BAT1 to the ground line GL using the switch S23 (step 22). Note that step 21 and step 22 are alternately performed on the pair of the first battery device BAT1 and the second battery device BAT2 adjacent to each other such that the voltage of the first power line PL is maintained at 800 V. When the SOC of the first battery device BAT1 and the second battery device BAT2 is not equalized after step 21 and step 22 are performed, step 21 and step 22 are repeated until the equalization is done. As described above, alternately performing step 21 and step 22 on the pair of the first battery device BAT1 and the second battery device BAT2 that are adjacent to each other equalizes the SOC in the pair of the first battery device BAT1 and the second battery device BAT2.

To perform power interchange between direct-current grids, the switch SW11 is turned on and step 21 and step 22 are performed. Step 21 and step S22 are performed alternately on a pair of the first battery device BAT1 and the second battery device BAT2 that are adjacent to each other such that the voltage of the first power line PL is also maintained at 800 V here. Also in this configuration, when the switch SW22 is turned on, power may be supplied from the power system 3 to the second battery device BAT2 via the AC/DC converter ACON.

In the case where the first battery device BAT1 and the second battery device BAT2 are connected in series, the potential of the first power line PL may be −800 V with respect to the ground line GL and the potential of the second power source line ML may be −400 V with respect to the ground line GL. In this case, the negative pole of the first battery device BAT1 is connected to the switch SW21 and the switch SW24 and the positive pole of the first battery device BAT1 is connected to the switch SW23. The negative pole of the second battery device BAT2 is connected to the switch SW21, the switch SW22, and the switch SW23 and the positive pole of the second battery device BAT2 is connected to the ground line GL. In this configuration, the negative pole serves as the first pole and the positive pole serves as the second pole.

The embodiments have been described above and the present disclosure is not limited to the embodiments described above and the present disclosure may be carried out in other various modes. For example, the above-described embodiments may be modified as follows to carry out the present disclosure. Note that each of the above-described embodiments and the following modification may be combined. What configured by combining components of each of the above-described embodiments and each modification is contained in the present disclosure. Further effects and modifications may be derived easily by those skilled in the art. Modes in a wide range of the present disclosure are not limited to the above-described embodiments and the modification and various changes may be made.

Figure 8:
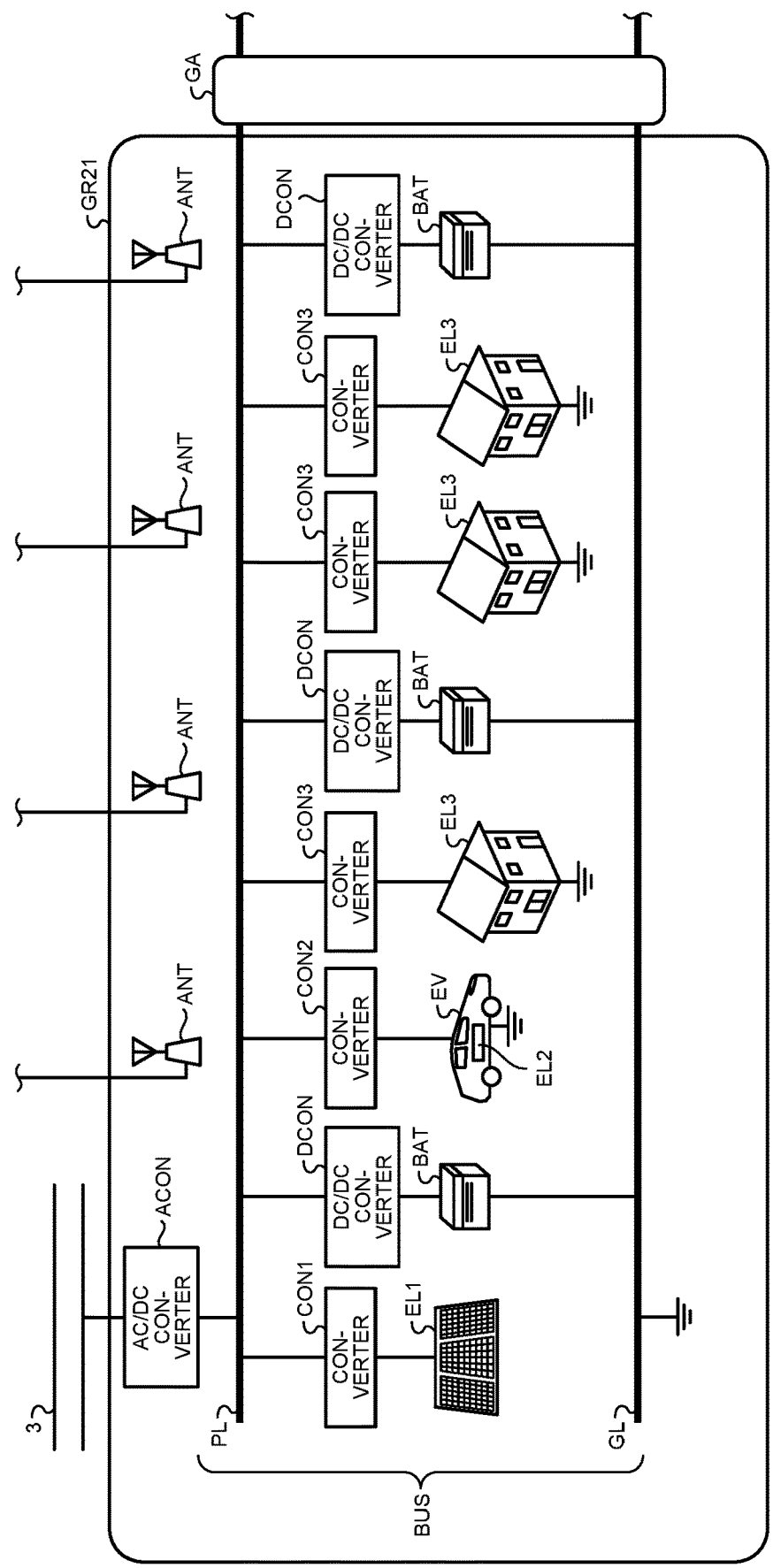
FIG. 8 is a diagram illustrating a modification of a direct-current grid.

FIG. 8 is a diagram illustrating a modification of the direct-current grid GR1. While the battery devices BAT are connected to the bus BUS not via DC/DC converters in the above-described first embodiment, in a direct-current grid GR21 illustrated in FIG. 8, a plurality of battery devices BAT are connected to a bus BUS at predetermined intervals via DC/DC converters SCON. The DC/DC converter DCON has a function of converting the voltage of direct-current power that is supplied by the battery device BAT and outputting the converted voltage to the bus BUS and converting the voltage of direct-current power that is supplied from the bus BUS and outputting the converted voltage to the battery device BAT to charge the battery device BAT. Also in the present modification, connecting the battery devices BAT to the bus BUS in a distributed manner at the predetermined intervals makes it possible to inhibit a voltage difference from occurring in the bus BUS and apply large electrical inertia.

Figure 9A:
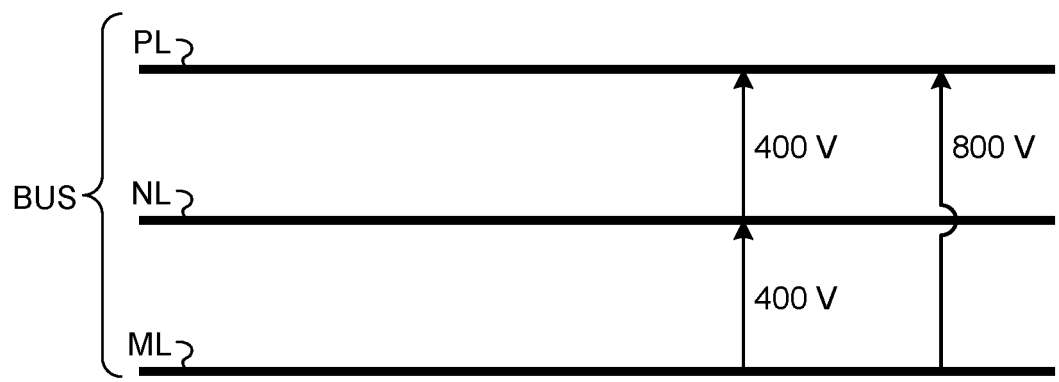
FIG. 9A is a diagram illustrating a configuration of a bus consisting of three lines.
Figure 9B:
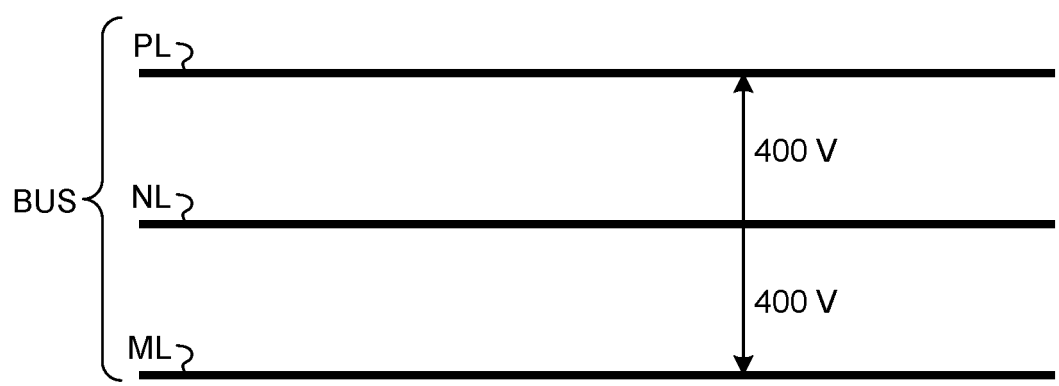
FIG. 9B is a diagram illustrating the configuration of the system consisting of three lines.

In the above-described first embodiment, the bus BUS consists of two lines; however, the bus BUS may consist of three lines. FIG. 9A and FIG. 9B are diagrams illustrating an example of the bus BUS consisting of three lines. The bus BUS illustrated in FIG. 9A includes the first power line PL, the second power line ML, and a neutral line NL. The first power line PL has a potential difference of +400 V with respect to the neutral line NL and the second power line ML has a potential difference of −400 V with respect to the neutral line NL. In the case of the bus BUS illustrated in FIG. 9A, power may be supplied at 800 V by the first power line PL and the second power line ML to the converter CON2 that performs rapid charging on the power element L2 and that supplies power to the power element EL2 that requires high power and power may be supplied at 400 V by the first power line PL and the neutral line NL or the second power line ML and the neutral line NL to the converter CON3 that supplies power to a home appliance that does not need high power. Note that, for example, power may be supplied at 800 V by the first power line PL and the second power line ML to an air conditioner that requires high power among home appliances. The battery device BAT may be connected to the first power line PL to prevent a voltage drop of the first power line PL at the time of power supply to the power element EL2.

In the bus BUS illustrated in FIG. 9B, the first power line PL has a potential difference of +400 V with respect to the neutral line NL and the second power line ML has a potential difference of +400 V with respect to the neutral line NL. In the case of the bus BUS illustrated in FIG. 9B, for example, power is supplied to the power element EL2 that requires high power. Power may be supplied by the neutral line NL and the second power line ML to the converter CON2 and power may be supplied at 400 V by the neutral line NL and the first power line PL to the converter CON3 that supplies power to a home appliance that requires stable power. As described above, separating the power line to which the load that requires high power is connected from the power line to which the load that requires stable power is connected makes it possible to inhibit voltage variations of the power line to which the load requiring stable power is connected. Note that the battery device BAT may be connected to the second power line ML to inhibit a voltage drop in the second power line at the time of power supply to the power element EL2.

In the above-described embodiments, the communication area CELL1 and the communication area CELL2 have a size of 1 km in radius; however, the size of the communication area CELL1 and the communication area CELL2 is not limited to the radius of 1 km and the size may be smaller than 1 km in radius or exceed 1 km in radius. In the above-described embodiment, the size of the small cell is 125 m in radius; however, the size of the small cell is not limited to the radius of 125 m and the size may be smaller than 125 m in radius or exceed 125 m in radius. The length of the bus BUS is not limited to 1 km, and the bus BUS may have a length smaller than 1 km or a length exceeding 1 km.

According to the above-described embodiments, when power interchange is performed between direct-current grids, power interchange may be performed by bidirectional radio power transfer. In the case of radio power interchange, because grids have no physical connection, work on the configuration for power transfer is easy. Compared to the configuration in which grids have physical connection, power cutoff between the direct-current grids is easy.

The present disclosure is usable for a power-communication fused network system.

The power system of the present disclosure includes a direct-current bus to which a power generation device and a plurality of power devices are connected and a plurality of battery devices that are connected at predetermined intervals from one end of the direct-current bus to the other end and that supplies and receives power to and from the direct-current bus. Connecting the battery devices to a direct-current bus in a distributed manner at predetermined intervals makes it possible to apply large electrical inertia to the direct-current bus and makes it possible to cancel a voltage difference in a short time.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power system comprising:
   a direct-current bus to which a power generation device and a plurality of power devices are connected; and
   a plurality of battery devices connected at predetermined intervals from one end of the direct-current bus to another end and configured to supply and receive power to and from the direct-current bus, wherein the direct-current bus includes:
   a reference line;
   a first power line having a predetermined voltage difference with respect to the reference line; and
   a second power line having a predetermined voltage difference with respect to the reference line, wherein the plurality of battery devices includes a first battery device and a second battery device,
   a first pole of the first battery device and a first pole of the second battery device are connected via a first switch,
   the first pole of the first battery device is connected to the first power line,
   the first pole of the second battery device is connected to the second power line via a second switch, and
   a second pole of the first battery device and a second pole of the second battery device are connected to the reference line, and
   the power system comprises a balance controller configured to control the first switch and the second switch to equalize a state of charge of the first battery device and the second battery device.

2. The power system according to claim 1, wherein the direct-current bus is connected to a power gate configured to control power interchange between the direct-current bus and another direct-current bus.

3. The power system according to claim 1, wherein the second power line is connected to an alternating-current power system via a converter configured to convert an alternating current into a direct current.

4. The power system according to claim 3, wherein the direct-current bus is connected to a power gate configured to control power interchange between the direct-current bus and another direct-current bus.

5. The power system according to claim 1, wherein
   the first pole of the first battery device is connected to the first power line via a fourth switch,
   the second pole of the first battery device is connected to the first pole of the second battery device via a third switch,
   and
   the power system comprises a balance controller configured to control the first to fourth switches to equalize a state of charge of the first battery device and the second battery device.

6. The power system according to claim 5, wherein the second power line is connected to an alternating-current power system via a converter configured to convert an alternating current into a direct current.

7. The power system according to claim 5, wherein the direct-current bus is connected to a power gate configured to control power interchange between the direct-current bus and another direct-current bus.

8. The power system according to claim 6, wherein the direct-current bus is connected to a power gate configured to control power interchange between the direct-current bus and another direct-current bus.

\* \* \* \* \*